United States Patent
Suzuki et al.

(10) Patent No.: US 9,137,774 B2
(45) Date of Patent: Sep. 15, 2015

(54) POSITION MEASUREMENT SYSTEM, POSITION INFORMATION PROVISION DEVICE, POSITION INFORMATION ADMINISTRATION DEVICE, AND POSITION MEASUREMENT METHOD

(75) Inventors: Takashi Suzuki, Chiyoda-ku (JP); Tomoharu Aoki, Chiyoda-ku (JP); Miho Kikkawa, Chiyoda-ku (JP)

(73) Assignee: NTT DOCOMO, INC., Tokyo (JP)

( * ) Notice: Subject to any disclaimer, the term of this patent is extended or adjusted under 35 U.S.C. 154(b) by 85 days.

(21) Appl. No.: 13/816,254

(22) PCT Filed: Apr. 17, 2012

(86) PCT No.: PCT/JP2012/060372
§ 371 (c)(1),
(2), (4) Date: Feb. 11, 2013

(87) PCT Pub. No.: WO2012/147567
PCT Pub. Date: Nov. 1, 2012

(65) Prior Publication Data
US 2013/0237251 A1    Sep. 12, 2013

(30) Foreign Application Priority Data

Apr. 27, 2011 (JP) .................................. 2011-099996

(51) Int. Cl.
| | |
|---|---|
| *H04W 24/00* | (2009.01) |
| *H04W 64/00* | (2009.01) |
| *H04W 4/02* | (2009.01) |
| *H04W 4/20* | (2009.01) |
| *G01S 19/06* | (2010.01) |

(52) U.S. Cl.
CPC ............... *H04W 64/00* (2013.01); *G01S 19/06* (2013.01); *H04W 4/02* (2013.01); *H04W 4/20* (2013.01)

(58) Field of Classification Search
CPC ................................ H04W 64/00; H04W 4/02
USPC ............................................. 455/456.1–457
See application file for complete search history.

(56) References Cited

U.S. PATENT DOCUMENTS

2011/0306356 A1* 12/2011 Aoyama et al. ............. 455/456.1

FOREIGN PATENT DOCUMENTS

| JP | 2008 175824 | 7/2008 | |
| WO | WO 2010/084959 A1 * | 7/2010 | ............. G01S 19/06 |

OTHER PUBLICATIONS

Nishida, K. et al., "Basic SAE Management Technology for Realizing All-IP Network," NTT DOCOMO Technical Journal, vol. 11, No. 3, p. 4 and 11, (Sep. 2009).

(Continued)

*Primary Examiner* — Vladimir Magloire
*Assistant Examiner* — Juan C Perez Tolentino
(74) *Attorney, Agent, or Firm* — Oblon, McClelland, Maier & Neustadt, L.L.P.

(57) ABSTRACT

A location support relating to a mobile station that can make use of multiple communication networks more efficiently. In an SUPL server of a location system, a judgment is made as to which of two communication networks is accessed by a mobile station based on information specifying the access point of the mobile station, with this access point being notified from the mobile station, whereby the information is then notified from the SUPL server to a location information management device. As a result, in the location information management device, requests to a communication network, which is not accessed by the mobile station, for location information for use in location of the mobile station are suppressed. This makes it possible for location support relating to a mobile station capable of using multiple communication networks to be carried out more efficiently.

5 Claims, 8 Drawing Sheets

(56) References Cited

OTHER PUBLICATIONS

International Search Report Issued May 22, 2012 in PCT/JP12/60372 Filed Apr. 17, 2012.
Combined International Preliminary Report on Patentability and Written Opinion of the International Searching Authority issued Nov. 7, 2013 in PCT/JP2012/060372 (submitting English translation only).

Office Action mailed Jan. 19, 2015, in Chinese Patent Application No. 201280002391.X (with English-language translation).

* cited by examiner

Fig.4

| MOBILE STATION # | LTE POSITION REGISTRATION INFORMATION | 3G POSITION REGISTRATION INFORMATION |
|---|---|---|
| 09000000001 | #A01 | #B01 |
| 09000000002 | #A02 | #B02 |
| ... | ... | ... |

POSITION MEASUREMENT SYSTEM, POSITION INFORMATION PROVISION DEVICE, POSITION INFORMATION ADMINISTRATION DEVICE, AND POSITION MEASUREMENT METHOD

TECHNICAL FIELD

The present invention relates to a location system that supports location by a mobile station, a location information providing device and location information management device included in this location system, and location method that uses this location system.

BACKGROUND ART

In a communication protocol (3G Protocol) standardized by the Third Generation Partnership Project (3GPP), location service is commonly carried out using mobile stations such as cell phones. In the case of employing an independent location method that measures location by receiving only radio waves from a GNSS satellite for the location method using mobile stations, there are concerns such as prolongation of location time or increased power consumption in the mobile station and the like. Consequently, a network assist method is employed that attempts to shorten location time by transmitting capturing information (assist data) such as the location of a GNSS satellite to a mobile station from a location assisted server (see, for example, Patent Literature 1).

CITATION LIST

Patent Literature

Patent Literature 1: Japanese Patent Application Laid-open No. 2008-175824

SUMMARY OF INVENTION

Technical Problem

In recent years, a new communication protocol in the form of Long Term Evolution (LTE) has been proposed. In the case of a mobile station that uses LTE that has been given specifications that enable it to also use the 3G protocol, the mobile station combines the use of two types of communication protocols. In addition, with respect to mobile stations combining the use of the 3G protocol and LTE, information relating to the exchange that controls the communication area in which the mobile station is in service for the 3G protocol, and information relating to the exchange that controls the communication area in which the mobile station is in service for the LTE protocol, are stored in a subscriber information database.

However, information relating to which communication protocol is used when the mobile station actually accesses a communication network for communication is not retained in the subscriber information database. Consequently, a location support device that has received a location request relating to a mobile station is required to specify the communication area accessed by the mobile station by inquiring to both exchanges for the two types of communication formats as to whether the mobile station has accessed the exchanges for communication in order to transmit the location result. In this manner, in the case of supporting location for a mobile station able to communicate in multiple communication protocols, the communication volume of the location support device ends up increasing. In addition, there is also the potential for a delay in the transmission of location results due to the increase in communication volume for transmitting location results by the location support device.

With the foregoing in view, an object of the present invention is to provide a location system capable of efficiently providing location support for a mobile station capable of using multiple communication networks, a location information providing device and location information management device included in this location system, and a location method that uses this location system.

Solution to Problem

In order to achieve the above-mentioned object, a location system according to an aspect of the present invention is a location system comprising: a location information providing device, which provides location information relating to a mobile station that can access first communication network and second communication network, which are mutually different from each other; and a location information management device, which acquires the location information provided by the location information providing device from the first communication network or the second communication network; wherein the location information providing device is provided with: a location information request reception unit for receiving a location information request requesting location information relating to the mobile station and containing information that specifies the first communication network in the case where the mobile station accesses the first communication network; a terminal information transmission unit for judging whether information specifying the first communication network is contained in the location information request received by the location information request reception unit, transmits, as terminal information, information that includes information specifying the first communication network and information specifying the mobile station to the location information management device in the case where information specifying the first communication network is contained, and transmitting, as terminal information, information specifying the mobile station to the location information management device in the case where information specifying the first communication network is not contained; and a location information providing unit for transmitting location information of the mobile station transmitted from the location information management device to the transmission source of the location information request as a result of the terminal information transmission unit transmitting the terminal information to the location information management device, and the location information management device is provided with: a service area information storage unit for storing information specifying location registration areas formed of multiple communication areas including communication areas that can be accessed by the mobile station in the first communication network and the second communication network; a terminal information reception unit for receiving the terminal information transferred from the location information providing device; a location information acquisition unit for judging whether or not information specifying the first communication network is contained in the terminal information acquired by the terminal information reception unit, and acquiring location information relating to a communication area contained in the location registration area of the first communication network acquired by the service area information storage unit from the first communication network in the case where information specifying the first communication network is contained, and moreover acquiring location information relating to a communication area contained in the location registration area of the second communication network acquired by the service area information storage unit from the second communication network in the case where information specifying the first communication network is not contained; and a location information transmission unit for transmitting location information acquired by the location information acquisition unit to the location information providing device after associating the same with information specifying the mobile station.

In addition, the location information providing device contained in the location system according to an aspect of the present invention is a location information providing device contained in a location system formed of a location information providing device, which provides location information relating to a mobile station that can access a first communication network and a second communication network, which are mutually different from each other, and a location information management device, which acquires location information provided by the location information providing device from the first communication network or the second communication network, the location information providing device being provided with: a location information request reception unit for receiving a location information request requesting location information relating to the mobile station and containing information that specifies the first communication network in the case where the mobile station accesses the first communication network; a terminal information transmission unit for judging whether information specifying the first communication network is contained in the location information request received by the location information request reception unit, and transmitting, in the form of terminal information, information that includes information specifying the first communication network and information specifying the mobile station to the location information management device in the case information specifying the first communication network is contained, and moreover transmitting, as terminal information, information specifying the mobile station to the location information management device in the case where information specifying the first communication network is not contained; and a location information providing unit for transmitting location information of the mobile station transmitted from the location information management device to the transmission source of the location information request as a result of the terminal information transmission unit transmitting the terminal information to the location information management device.

In addition, the location information management device contained in the location system according to an aspect of the present invention is a location information management device contained in a location system formed of a location information providing device, which provides location information relating to a mobile station that can access first communication network and second communication network, which are mutually different from each other, and a location information management device, which acquires location information provided by the location information providing device from the first communication network or the second communication network, the location information management device being provided with: a service area information storage unit for storing information specifying communication areas in the first communication network and the second communication network that can be accessed by the mobile station after associating the same with information specifying the mobile station; a terminal information reception unit for receiving terminal information that contains information specifying the mobile station transferred from the location information providing device; a location information acquisition unit for judging whether or not information specifying the first communication network is contained in the terminal information acquired by the terminal information reception unit, and acquiring location information relating to a communication area contained in a location registration area of the first communication network acquired by the service area information storage unit from the first communication network in the case where information specifying the first communication network is contained, and moreover acquiring location information relating to a communication area contained in the location registration area of the second communication network acquired by the service area information storage unit from the second communication network in the case where information specifying the first communication network is not contained; and a location information transmission unit for transmitting location information acquired by the location information acquisition unit to the location information providing device after associating the same with information specifying the mobile station.

According to the location system according to an aspect of the present invention, and the location information providing device and location information management device contained in the location system, a judgment is made in the location information providing device as to whether or not a mobile station specifies a first communication network based on whether or not information specifying the first communication network is contained in a location information request from the mobile station. The result thereof is transmitted from the location information providing device to the location information management device, and a judgment is made in the location information management device as to whether the communication network accessed by the mobile station is the first communication network or a second communication network based on information indicating the access point of the mobile station notified from the location information providing device. On the basis of the result of this judgment, location information of the communication area able to be accessed by the mobile station in the communication network judged to have been accessed is acquired based on information specifying a location registration area, and the result thereof is notified to the mobile station from the location information management device via the location information providing device. In this manner, as a result of carrying out processing that specifies a communication network accessed by a mobile station prior to acquiring location information, since inquiries regarding location information to a communication network not accessed by the mobile station can be suppressed, location support relating to a mobile station capable of using multiple communication networks can be provided more efficiently.

Furthermore, in addition to being able to describe the present invention as an invention of a location system as described above, the present invention can also be described as an invention of a location method in the manner described below. However, this is substantially the same invention and only differs by the category thereof, and similar actions and effects are demonstrated.

Namely, the location method according to an aspect of the present invention is a location method that uses a location system formed of a location information providing device, which provides location information relating to a mobile station that can access a first communication network and second communication network, which are mutually different from each other, and a location information management device, which is provided with a service area information storage unit for storing information specifying communication areas in the first communication network and the second communication network where the mobile station exists after associating the same with information specifying the mobile station, and which acquires location information provided by the location information providing device from the first communication network or the second communication network, the method comprising: a location information request reception step, carried out by a location information request reception unit of the location information providing device, of receiving a location information request requesting location information relating to the mobile station, with information that specifies the first communication network being contained in the case where the mobile station accesses the first communication network; a terminal information transmission step, carried out by a terminal information transmission unit of the location information providing device, of judging whether information specifying the first communication network is contained in the location information request received in the location information request reception step, and transmitting, as terminal information, information that includes information specifying the first communication network and information specifying the mobile station to the location information management device in the case where information specifying the first communication network is contained, and moreover transmitting, as the terminal information, information specifying the mobile station to the location information management device in the case where information specifying the first communication network is not contained; a location information providing step, carried out by a location information providing unit of the location information providing device, of transmitting location information of the mobile station transmitted from the location information management device to the transmission source of the location information request as a result of transmitting the terminal information to the location information management device in the terminal information transmission step; a terminal information reception step, carried out by a terminal information reception unit of the location information management device, of receiving the terminal information transferred from the location information providing device; a location information acquisition step, carried out by a location information acquisition unit of the location information management device, of judging whether or not information specifying the first communication network is contained in the terminal information acquired in the terminal information reception step, and acquiring location information relating to a communication area contained in a location registration area of the first communication network acquired by the service area information storage unit from the first communication network in the case where information specifying the first communication network is contained, and moreover acquiring location information relating to a communication area contained in the location registration area of the second communication network acquired by the service area information storage unit from the second communication network in the case where information specifying the first communication network is not contained; and a location information transmission step, carried out by a location information transmission unit of the location information management device, of transmitting location information acquired in the location information acquisition step to the location information providing device after associating the same with information specifying the mobile station.

Advantageous Effects of Invention

According to the present invention, a location system capable of efficiently providing location support relating to a mobile station able to use multiple communication networks, a location information providing device and a location information management device contained in this location system, and a location method using this location system, are provided.

BRIEF DESCRIPTION OF DRAWINGS

FIG. 4 shows an example of location registration information stored in a home location register (HLR);

DESCRIPTION OF EMBODIMENTS

<Configuration of Location System>

Figure 1:
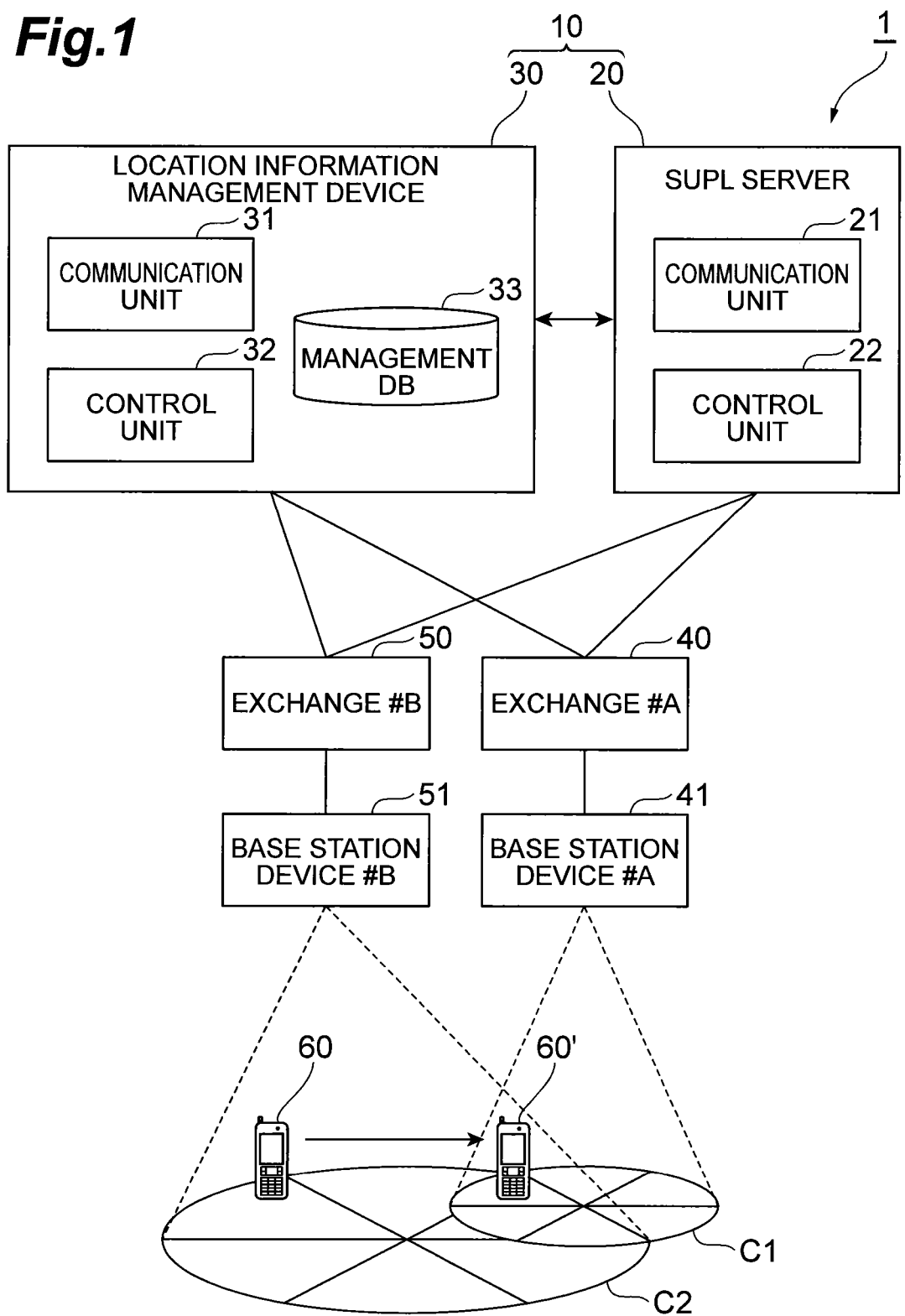
FIG. 1 is a block diagram for explaining the configuration of a communication system according to one embodiment of the present invention.

FIG. 1 is a block diagram for explaining the configuration of a communication system 1 according to one embodiment of the present invention. The communication system 1 is composed of an SUPL server 20 that composes a location system 10 (location information providing device), and a location information management device 30, an exchange #A40, an exchange #B50, a base station device #A41, a base station device #B51 and a mobile station 60. Among these, the location system 10 composed of the SUPL server 20 and the location information management device 30 is a device that supports location arithmetic processing by the mobile station 60. In addition, the exchange #A40 and the base station device #A41 are devices that compose a first communication network in the form of an LTE communication network, the exchange #A40 is a device located upstream from a plurality of base station devices, and the base station device #A41 is a device provided under the control of the exchange #A40 for forming a cell C1 in the LTE communication network. In addition, the exchange #B50 and the base station device #B51 are devices that compose a second communication network in the form of a 3G communication network, the exchange #B50 is a device located upstream from a plurality of base station devices, and the base station device #B51 is a device provided under the control of the exchange #B50 for forming a cell C2 in the 3G communication network. Although there are other devices for composing the LTE communication network and composing the 3G communication network in addition to the above-mentioned exchanges #A and #B and the base station devices #A and #B, descriptions thereof are omitted in the present embodiment.

The following provides an explanation of a location method carried out by the mobile station 60 in the present embodiment. The location method carried out by the mobile station 60 in the present embodiment refers to a global location system (GPS) (GPS is one of GNSS: global navigation satellite systems) employing network assist (network-assisted GPS or A-GPS). Although GPS location refers to a method for calculating the location (and more precisely, the latitude, longitude and altitude) of a receiving terminal (mobile station 60) based on location information from GPS satellites by receiving signals from three or more orbiting GPS satellites, it is necessary for the mobile station 60 to capture the GPS satellites in order to carry out this location, and a certain amount of time is required for this processing. Consequently, in the case of the network-assisted GPS location according to the present embodiment, processing time and location time related to GPS satellite capture by the mobile station 60 can be shortened by transmitting information (assist data), such as the locations of GPS satellite and the approximate location (initial location) of the mobile station 60, from the location system 10 to the mobile station. In the present embodiment, GPS location by the mobile station 60 is carried out and the location of the mobile station 60 is determined by receiving information indicating the approximate location of the mobile station 60 and GPS satellite location information for which a signal can be received by the mobile station 60 from the location system 10 in response to a request from the mobile station 60 to provide assist data to the location system 10.

Among the assist data sent to the mobile station 60 from the location system 10, information acquired from an assist data provider (not shown) that manages startup information of the GPS satellites in the location system 10 is used with respect to GPS satellite location information. On the other hand, location information on a base station device that transmits radio waves to a cell (communication area) able to be accessed by the mobile station 60 is used for the approximate location information of the mobile station 60. Since the location of the base station device is predetermined, location information of the base station device can be stored in advance in the location system 10, and in the case information specifying a cell able to be accessed by the mobile station 60 is transmitted from the mobile station 60, approximate location information of the mobile station 60 can be transmitted to the mobile station 60 based on that information. Location information of the base station device as referred to here includes latitude information, longitude information, altitude and error radius of the base station device.

In addition, the SUPL used in the present embodiment is that defined by the Open Mobile Alliance (OMA), and refers to an assisted GPS location system that utilizes a user plane (U-plane) as a communication bearer for transmitting assist data between the mobile station 60 and a communication network.

The following provides an explanation of each of the devices contained in the above-mentioned communication system 1. First, the SUPL server 20 that composes the location system 10 contained in the communication system 1 is a device that has the main function of the location system 10, and has a function that stores assist data transmitted to the mobile station 60 and transmits assist data to the mobile station 60 based on a request from the mobile station 60.

The location information management device 30, which composes the location system 10 in the same manner as the SUPL server 20, has a function for carrying out authentication processing for carrying out communications relating to location with the mobile station 60 and the function of a gateway mobile location center (GMLC) and home subscriber server (HSS) that manage data relating to location information in a 3G communication network and LTE communication network, and is realized in the form of, for example, an external business user service control point (EBSCP) and IP service control point (IPSCP). In the present embodiment, although an explanation is provided of a location information management device having both the functions of an EBSCP and IPSCP, location information management devices may also be composed in which these functions are separate. More specifically, the location information management device 30 stores location registration logs and the like of the mobile station 60 in the 3G communication network and LTE communication network, and transmits that data to the SUPL server 20 as necessary. Detailed processing as relating to the present embodiment will be subsequently described.

The mobile station 60 is realized in the form of a device used by a user, and more specifically, a device having a communication function such as a cell phone or personal digital assistance (PDA). In addition, the mobile station 60 according to the present embodiment is a terminal that has a function that carries out GPS location using assist data from the location system 10 and a function that connects to both the above-mentioned 3G communication network and LTE communication network. In the case the location of the mobile station 60 has been registered in a cell C1 of the LTE communication network, information relating to location registration (information indicating a location registration area indicating which exchange the accessed base station is under the control of) is registered in the location information management device 30 via the exchange #A40. In addition, in the case the location of the mobile station 60 has been registered in a cell C2 of the 3G communication network as well, information relating to location registration is registered in the location information management device 30 via the exchange #B50.

Furthermore, the mobile station 60 is unable to simultaneously communicate via both communication networks. Thus, only one communication network can actually be used by the mobile station 60 to communicate. In addition, even in the case of switching the communication network used to communicate between the 3G communication network and the LTE communication network, in the case the cell that is accessed in each communication network is not changed, location registration information retained in the location information management device 30 is not updated. More specifically, as shown in FIG. 1, in the case the mobile station 60 accessing the cell C2 of the 3G communication network under the control of the exchange #B50 moves and accesses the cell C1 of the LTE communication network under the control of the exchange #A40, information relating to the cell C1 is registered in the location information management device 30. However, since cell C2 accessed by the mobile station 60 in the 3G communication network has not changed, information relating to the cell C2 in the location information management device 30 is not updated. In addition, although the mobile station 60 that has moved shown in FIG. 1 is able to communicate via the 3G communication network and communicate via the LTE communication network, the location information management device 30 is unable to ascertain which communication network is accessed.

In addition, in the case the mobile station 60 has moved between communication areas under the control of the same exchange (such as the exchange #A40 or the exchange #B50), although the case, for example, of having moved from the cell C2 according to the base station device #B51 to a cell according to another base station device under the control of the same exchange #B50 can be considered, in this case, information that the accessed base station device has changed is not notified to the location information management device 30. This has been defined for the purpose of location registration signal reduction (idle mode signaling reduction, ISR)

when the mobile station 60 has changed the access point between the LTE communication network and the 3G communication network.

Figure 2:
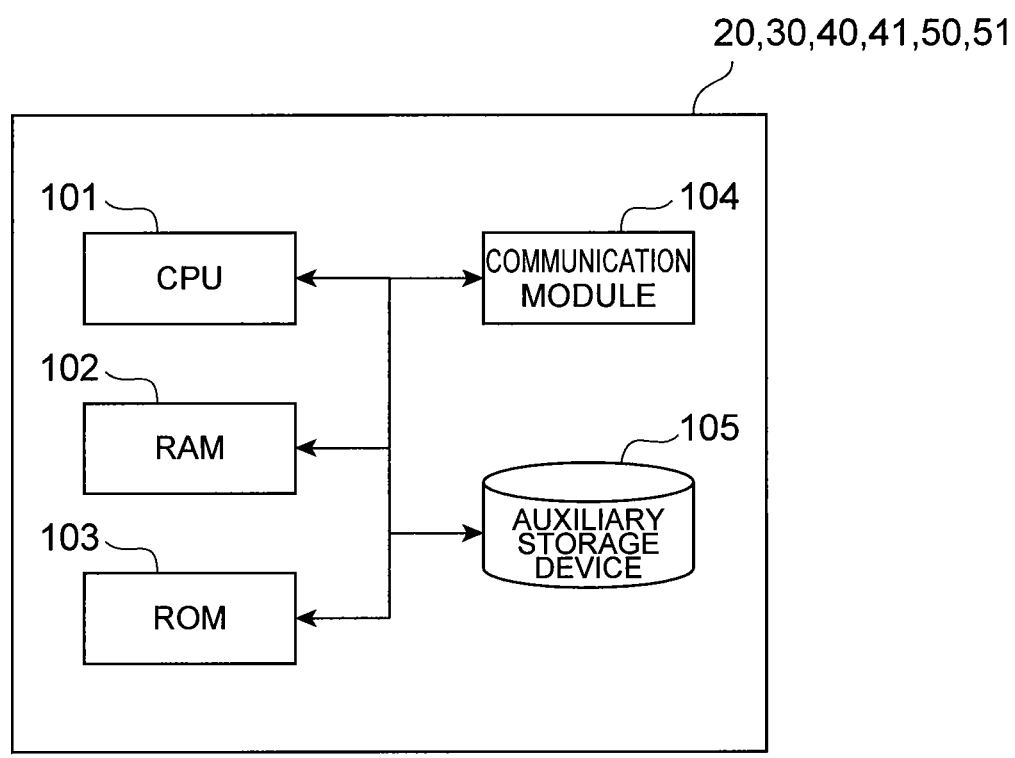
FIG. 2 is a drawing showing the hardware configuration of various devices contained in a location system.
Figure 3:
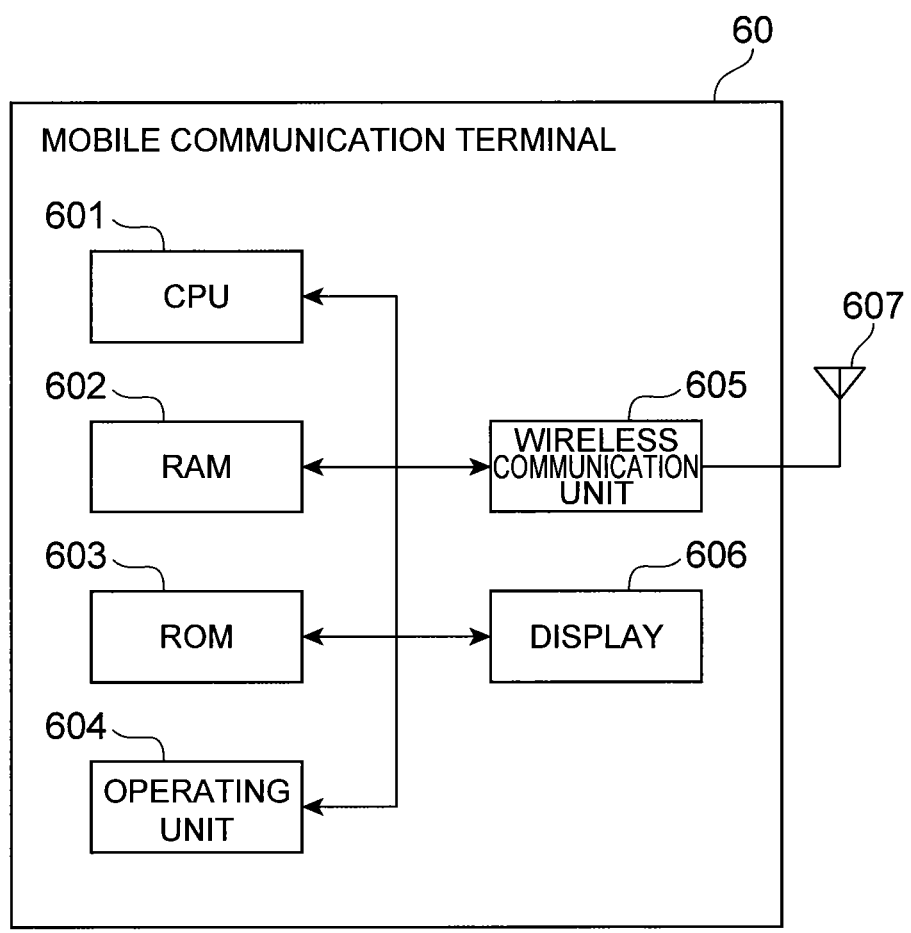
FIG. 3 is a drawing showing the hardware configuration of a mobile station.

The SUPL server 20, the location information management device 30, the exchange #40A and the exchange #50B contained in the above-mentioned communication system 1 are respectively composed in the form of a computer provided with hardware such as a CPU 101, main storage devices in the form of random access memory (RAM) 102 and read only memory (ROM) 103, a communication module 104 for carrying out communication, and an auxiliary storage device 105 such as a hard disk as shown in FIG. 2. The functions of each device are demonstrated by the operations these constituents. In addition, as shown in FIG. 3, the mobile station 60 is composed of hardware such as a central processing unit (CPU) 601, RAM 602, ROM 603, operating unit 604, wireless communication unit 605, display 606 and antenna 607. The functions of the mobile station 60 are demonstrated by the operations of these constituents.

Furthermore, the SUPL server 20 and the location information management device 30, the SUPL server 20 and the exchange #A40, the SUPL server 20 and the exchange #B50, the location information management device 30 and the exchange #A40, the location information management device 30 and the exchange #B50, and exchange #A40 and the base station device #A41, and the exchange #B50 and the base station device #B51 are respectively connected via a wired network. In addition, information is respectively exchanged between the mobile station 60 and the base station device #A41 and between the mobile station 60 and the base station device #B51 by wireless communications.

Returning to FIG. 1, the following provides a detailed explanation of the SUPL server 20 and the location information management device 30 contained in the location system 10 that are contained in the communication 1 and serve as location support devices that characterize the present invention. The SUPL server 20 is composed of a communication unit (location information request reception means, terminal information transmission means, location information providing means) 21 and a control unit (terminal information transmission means) 22. In addition, the location information management device 30 is composed of a communication unit (terminal information reception means, location information transmission means, location information acquisition means) 31, a control unit (location information acquisition means) 32 and a management database (DB) (service area information storage means) 33.

The communication unit 21 of the SUPL server 20 has the function of location information request means that acquires approximate location information of a communication area accessed by the mobile station 60 from a mobile communication network N2 based on a location information request transmitted from the mobile station 60. Here, the location information request transmitted from the mobile station 60 contains the ID number of a base station device (eNodeB) directly accessed by the mobile station 60 in the cell C1 able to be accessed by the mobile station 60 as information that indicates that the mobile station 60 has accessed the LTE network in the case of having accessed the LTE network. On the other hand, information specifying a base station device is not contained in the case the mobile station 60 has accessed the 3G network. In addition, information specifying the mobile station 60 is contained in the location information request.

In addition, the communication unit 21 functions as location information transmission means that transmits assist data containing approximate location information of the mobile station 60 transmitted from the location information management device 30 to the mobile station 60. In addition, it further has a function for exchanging information with the location information management device 30. Information received by the communication unit 21 is sent to the control unit 22.

The control unit 22 has a function that requests the providing of approximate location information of the mobile station 60 by transmitting terminal information (mobile station information) to the location information management device 30 based on a location information request transmitted from the mobile station 60. More specifically, a judgment is made as to whether or not information specifying the LTE communication network is contained in a location information request, and in the case information specifying the LTE communication network is contained, information including information specifying the LTE communication network and information specifying the mobile station 60 is transmitted in the form of terminal information to the location information management device 30, while in the case information specifying the LTE communication network is not contained, information specifying the mobile station 60 is transmitted in the form of terminal information to the location information management device 30. Information such as the ID number of a base station device (eNodeB) directly accessed by the mobile station 60 in the cell C1 able to be accessed by the mobile station 60 or the ID number of a device that houses and controls the base station device (eNodeB) in the form of a mobility management entity (MME) is used as information specifying the LTE communication network. Furthermore, a method consisting only of assigning a flag indicating whether or not the mobile station 60 is able to access the LTE communication network may be employed instead of using the above-mentioned information as information specifying the LTE communication network.

Returning to FIG. 1, the following provides an explanation of the location information management device 30 contained in the location system 10. The communication unit 31 of the location information management device 30 is provided with functions that carry out communication with an external device, and more specifically, has the function of terminal information reception means that receives terminal information of the mobile station 60 from the SUPL server 20, a portion of the function of location information acquisition means that acquires location information of a communication area accessed by the mobile station 60 based on the terminal information, and the function of location information transmission means that transmits location information of a communication area accessed by the mobile station 60 to the SUPL server 20. Terminal information acquired by the communication unit 31 is sent to the control unit 32.

The control unit 32 is responsible for a portion of the function of location information acquisition means that acquires location information of a communication area accessed by the mobile station 60 based on terminal information. More specifically, a judgment is made as to whether or not information specifying the LTE communication network is contained in terminal information transmitted from the SUPL server 20 and received by the communication unit 31, and in the case information specifying the LTE communication network is contained, information specifying a communication area accessed by the mobile station 60 in the LTE communication network is acquired by referencing the management DB 33, while in the case information specifying the LTE communication network is not contained in the terminal information, information specifying a communication area accessed by the mobile station 60 in the LTE communication network is acquired by referencing the management DB 33.

In this manner, the control unit 32 has a function that judges which communication network is being used for communication by the mobile station 60 based on terminal information of the mobile station 60 transmitted from the SUPL server 20. This result is notified to the communication unit 31 and is used when the communication unit 31 inquires of cell location information to an exchange.

The management DB 33 functions as service area information storage means that stores information specifying the mobile station 60 and information that the mobile station 60 specifies a location registration area of the mobile station 60 in the LTE communication network and the 3G communication network, namely information specifying an exchange accessed by the mobile station 60, in mutual association. More specifically, as shown in FIG. 4, information stored in the management DB 33 refers to information specifying the mobile station 60 (telephone number of mobile station in FIG. 4), information specifying the exchange for which the location of the mobile station 60 is registered in the LTE communication network (such as #A01 or #A02), and location specifying the exchange for which the location of the mobile station 60 is registered in the 3G communication network (such as #B01 or #B2) stored in mutual association. Information stored in the management DB 33 is updated in the case the mobile station 60 is able to access each communication network and the location thereof has been registered. In addition, in the case the exchange used by the mobile station in each communication network has changed as a result of movement and the like, since a request to update information is made to the location information management device 30 from the mobile station 60, information stored in the management DB 33 of the location information management device 30 is updated based on that request.

The exchange #A40 and the exchange #B50 function as exchanged in the LTE communication network and 3G communication network, respectively. In addition, the base station device #A41 and the base station device #B51 function as base station devices in the LTE communication network and 3G communication network, respectively. In the present embodiment, when a location information request relating to location of the mobile station 60 is received from the location information management device 30, the exchange #A40 and the exchange #B50 have a function that transmits location information of a communication area (cell) accessed by the mobile station 60 to the location information management device 30 after having confirmed that the mobile station 60 is connected to a local network. In the case the mobile station 60 has been confirmed to not be connected to the local network, a notification that the mobile station 60 is not connected to the local network is made by returning an error message.

In the communication system 1 according to the present embodiment, the functioning of each of the above-mentioned devices realizes more efficient location support. The following provides a detailed explanation of the specific method thereof.

<Location Method Using Location System (Method of Providing Location Information)>

Figure 5:
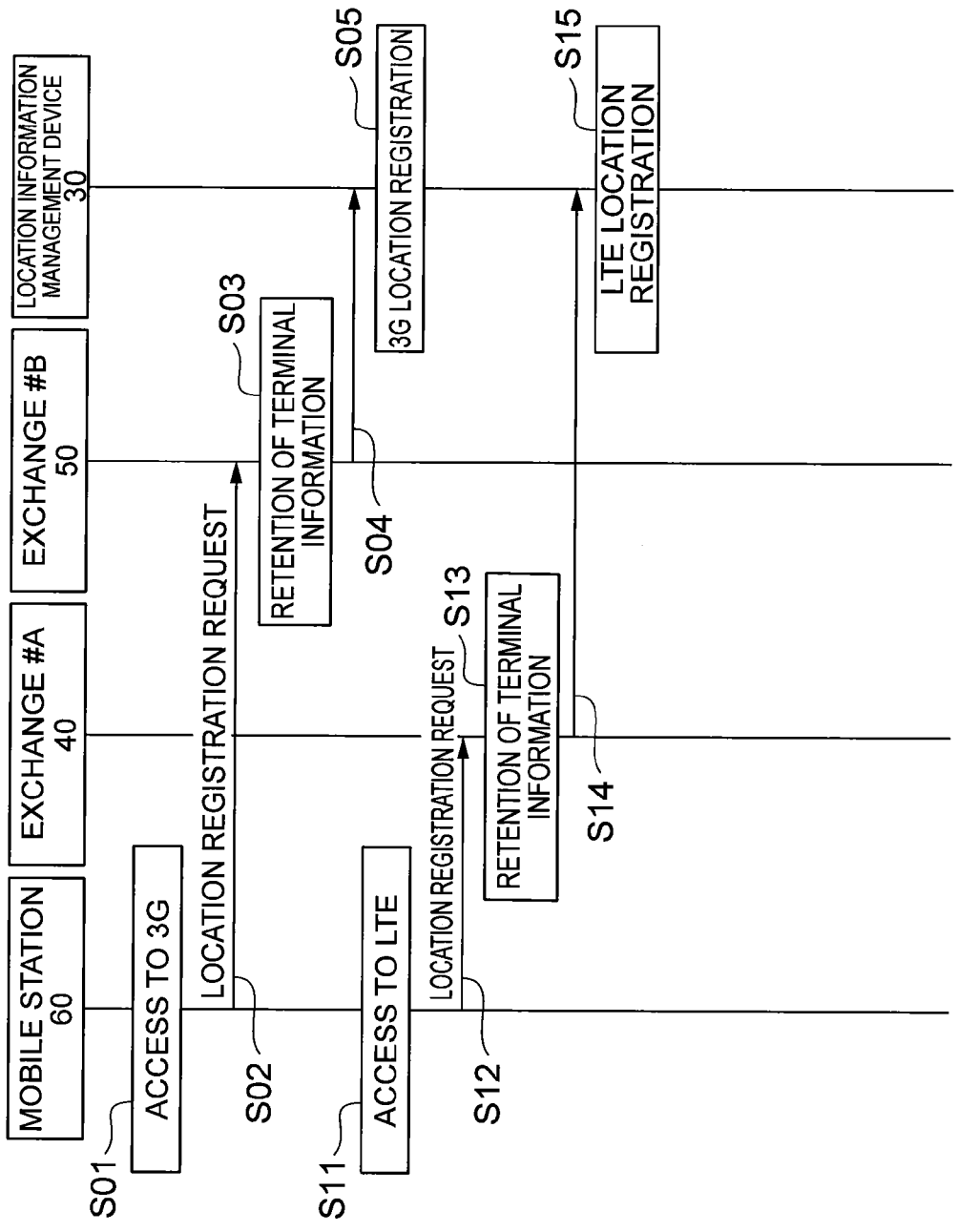
FIG. 5 is a sequence diagram for explaining processing carried out by a mobile station during location registration.
Figure 6:
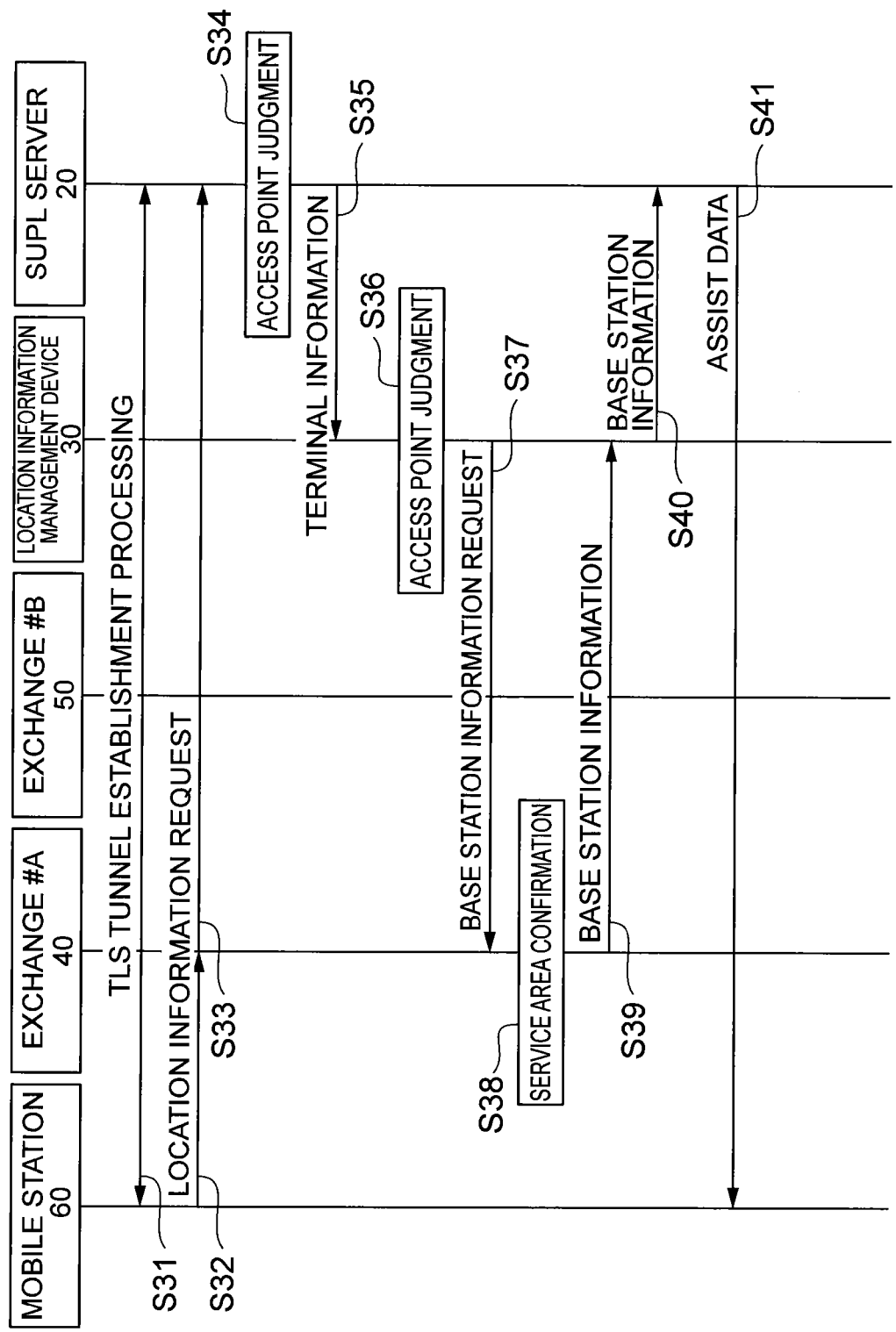
FIG. 6 is a sequence diagram for explaining processing for providing location information relating to a mobile station.
Figure 7:
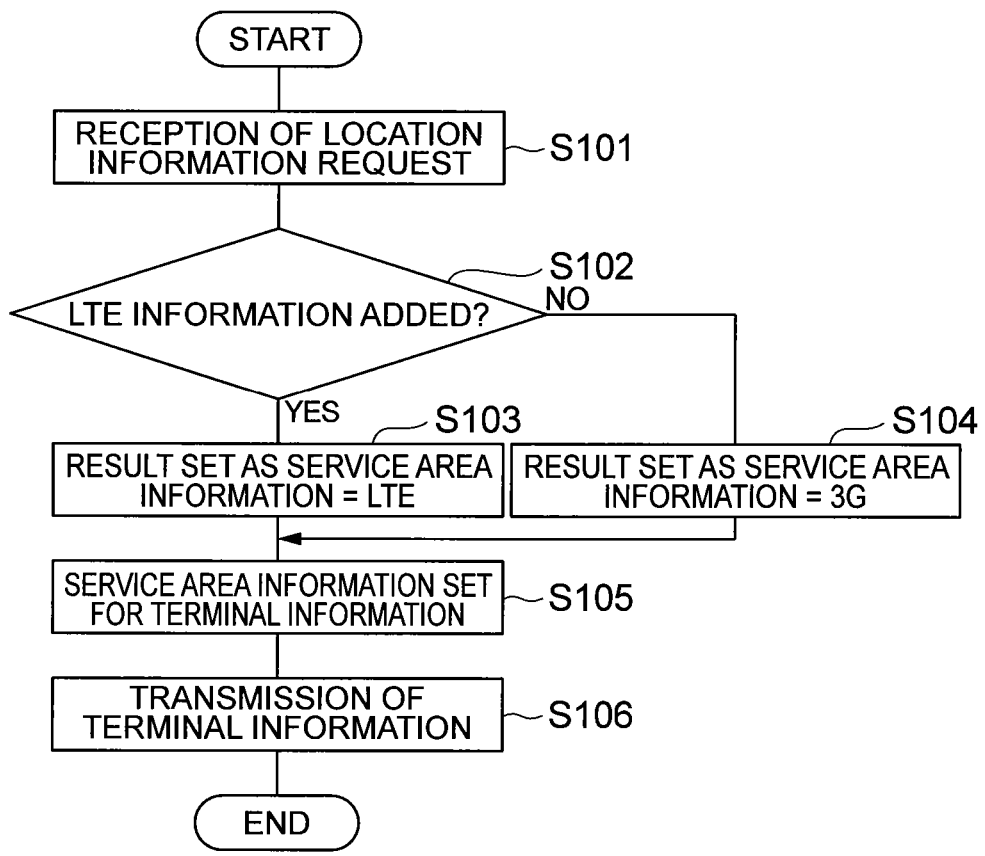
FIG. 7 is a flow chart for explaining processing carried out by a secure user plane location (SUPL) server for providing location information relating to a mobile station.
Figure 8:
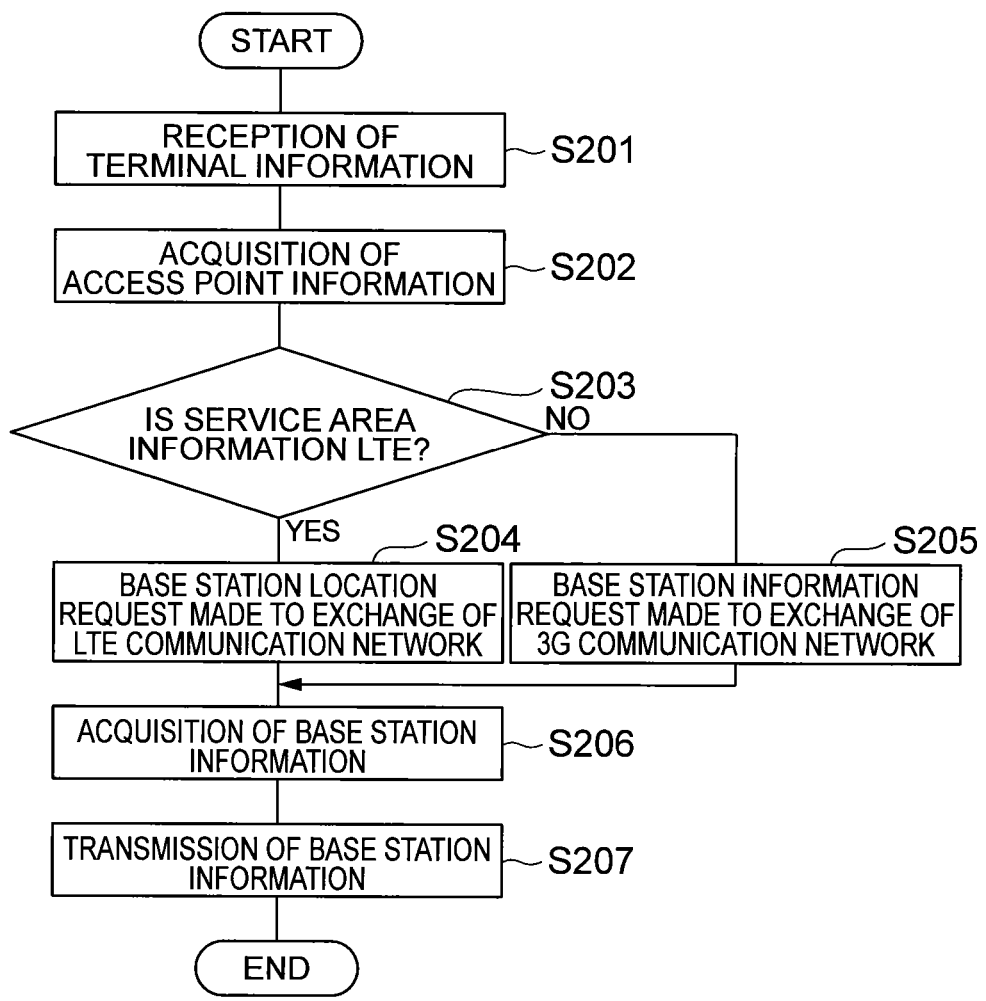
FIG. 8 is a sequence diagram for explaining processing carried out by a location information management device for providing location information relating to a mobile station.

The following provides an explanation of a location method using the communication system 1 containing the above-mentioned location system 10 (method of providing location information) using the sequence diagrams and flow chart of FIGS. 5 to 8. Furthermore, FIG. 5 is a sequence diagram for explaining processing carried out by the mobile station 60 relating to location registration, and FIG. 6 is a sequence diagram for explaining processing in the case of carrying out location relating to the mobile station 60. In addition, FIG. 7 is a flow chart for explaining processing in the SUPL server 20, and FIG. 8 is a flow chart for explaining processing in the location information management device 30.

An explanation is first provided of processing relating to location registration of the mobile station 60 using FIG. 5. The following processing is carried out with a C-Plane protocol stack primarily carrying out control. First, in the case the mobile station 60 is able to access the 3G communication network (S01), a location registration request is transmitted to the exchange #B50 via a base station device (not shown) from the mobile station 60 (S02). At this time, the exchange #B50 that has received the location registration request updates information relating to the access point of the mobile station 60 (information specifying a cell able to be accessed by the mobile station 60) (S03), and this location registration request is transmitted from the exchange #B50 to the location information management device 30 (S04). As a result, information stored in the management DB 33 of the location information management device 30 is updated, and the location of the mobile station 60 in the 3G communication network is registered (S05).

Next, in the case the mobile station 60 is able to access the LTE communication network (S11), processing is carried out that is the same as that in the case of the 3G communication network. More specifically, a location registration request is transmitted to the exchange #A40 via a base station device (not shown) from the mobile station 5 (S12). At this time, the exchange #A40 that has received the location registration request updates information relating to the access point of the mobile station 60 (information specifying the cell able to be accessed by the mobile station 60) (S13), and this location registration request is transmitted to the location information management device 30 from the exchange #A40 (S14). As a result, information stored in the management DB 33 of the location information management device 30 is updated, and the location of the mobile station 60 in the LTE communication network is registered (S15).

With reference to FIG. 6, the following provides an explanation of processing relating to the providing of location information to the mobile station 60. The following processing is carried out with a U-Plane protocol stack that handles user data.

First, processing is carried out for establishing a transport layer security (TLS) tunnel serving as a communication path for exchanging information relating to location between the mobile station 60 and the SUPL server 20 (S31). This is established between the mobile station 60 and the SUPL server 20, which transmits assist data for GPS location to the mobile station 60, in the case of carrying out GSP location in the mobile station 60, and more specifically, consists of the establishment of a TLS tunnel after having established a transmission control protocol (TCP) connection.

Next, a location information request (ULP_SUPL-START) is transmitted from the mobile station 60 to the SUPL server 20 via the exchange #A40 using this TLS tunnel, and this information location request is received in the SUPL server 20 (S32, S33, location information request reception step). The location information request transmitted from the mobile station 60 to the SUPL server 20 contains a session ID (identifier commonly assigned once to all processing relating to GPS location) and information specifying the mobile station 60. Moreover, in the case the mobile station 60 is connected to the LTE communication network, information specifying the LTE communication network (such as information specifying a base station accessed by the mobile station 60 in the LTE communication network) is also contained.

In the SUPL server 20, when the communication unit 21 has received a location information request, the location information request is sent to the control unit 22 and in the control unit 22, a judgment is made as to whether the access point of the mobile station 60 is the 3G communication network or the LTE communication network (S34), and terminal information is transmitted from the SUPL server 20 to the location information management device 30 based on that result (S35). A detailed explanation of this judgment method is provided using FIG. 7.

As shown in FIG. 7, in the control unit 22 of the SUPL server 20, when a location information request is received (S101/S33), a judgment is first made as to whether information relating to the LTE communication network has been added (S102). In the case the mobile station 60 is connected to the LTE communication network, since information specifying the LTE communication network is added to the location information request, the mobile station 60 is judged to be able to access the LIE communication network, and that result is set as "service area information=LTE" (S103). In addition, in the case information specifying the LTE communication network is not added to the location information request, the mobile station 60 is judged to be able to access the 3G communication network, and that result is set as "service are information=3G" (S104). Subsequently, service area information is set for information specifying the mobile station 60 (S105), and the terminal information is transmitted to the location information management device 30 (S106/S35). Furthermore, setting of service area information for information specifying the mobile station 60 can also use a method such as assigning mutually different flags.

Next, returning to FIG. 6, terminal information transmitted from the communication unit 21 of the SUPL server 20 (S35) is received by the communication unit 31 of the location information management device 30 and a judgment is made as to the access point by the control unit 32 (S36). A detailed explanation of this judgment method is provided using FIG. 8.

As shown in FIG. 8, when terminal information is received by the communication unit 31 of the location information management device 30 (S201), access point information is acquired from the management DB 33 based on information specifying the mobile station 60 included in terminal information in the control unit 32 (S202). Here, in the control unit 32, in the case multiple sets of access point information are stored in association with the mobile station 60 (such as storage of both information relating to the 3G communication network and information relating to the LTE communication network), both sets of access point information are acquired by the control unit 32.

Next, whether or not the LTE communication network has been set as service area information is confirmed in the control unit 32 by referencing service area information contained in the terminal information (S203). Here, in the case the LTE communication network is set as service area information, the control unit 32 requests base station location (providing of base station information) to an exchange of the LTE communication network (exchange #A40 in the present embodiment) based on access point information in the LTE communication network contained among access point information of the mobile station 60 acquired from the management DB 32 (S204). In addition, in the case the 3G communication network is set as service area information, the control unit 32 requests base station location (providing of base station information) to an exchange of the 3G communication network (exchange #B50 in the present embodiment) based on access point information in the 3G communication network of the access point information of the mobile station 60 obtained from the management DB 32 (S205).

As a result, base station information is acquired (S206) and this base station information is transmitted from the communication unit 31 of the location information management device 30 to the SUPL server 20 (S207) as a result of the communication unit 31 of the location information management device 30 communicating with an exchange of the LTE communication network or the 3G communication network.

Returning to FIG. 6, the following provides an explanation that includes processing in other devices with respect to the case of service area information having been determined to be that of the LTE communication network as a result of having carried out access point judgment in the location information management device 30 (S36). In the case the mobile station 60 has been judged to be connected to the LTE communication network as a result of the access point judgment (S36), a base station information request (ELP_PROVIDE SUBSCRIBER LOCATION REQUEST) is made to the exchange #A40 (S37). As a result, the exchange #A40 confirms the service area as to whether the mobile station 60 is actually connected based on information of the mobile station 60 contained in the base station information request (S38). More specifically, an inquiry (S1AP_DOWNLINK UEASSOCIATED LPPA TRANSPORT) is transmitted from the exchange #A40 to the base station device based on communication with a server (not shown) managing location information of the base station device in the LTE communication network (LCS-AP Location Request/LCS-AP Connection Oriented Information Transfer), and confirmation is made as to whether there is a reply (S1AP_UPLINKUE ASSOCIATED LPPA TRANSPORT) from the base station device in response thereto.

Here, in the case the mobile station 60 has been confirmed to be able to access the LTE communication network, information indicating the location of the base station device of the communication area (cell) accessed by the mobile station 60 (base station information) is acquired (LCS-AP Connection Oriented Information Transfer/LCS-AP LOCATION RESPONSE), and that information is transmitted to the location information management device 30 as information roughly indicating the location where the mobile station 60 is located (approximate location) (S39).

In the communication unit 31 of the location information management device 30, when base station information relating to the mobile station 60 is received from the exchange #A40, that base station information is transmitted to the SUPL server 20 (S40), and a location start instruction that includes assist data (ULP SUPL-RESPONSE) based on this base station information is transmitted to the mobile station 60 from the communication unit 21 of the SUPL server 20 (S41). As a result, GPS location is carried out using this assist data in the mobile station 60. This completes processing relating to the providing of location information relating to the mobile station 60.

Furthermore, in the case the 3G communication network has been set for service area information as a result of carrying out the access point judgment (S36) in the location information management device 30, communication is carried out in the same manner as described above (S37 to S40) with the exchange #B50 of the 3G communication network, and as a result, access data based on base station information of a cell able to be accessed by the mobile station 60 is transmitted to the mobile station 60 (S41).

<Effects of Location Support System and Location Method>

As has been described above, according to the location system 10 and the location method using this location system 10 according to the above-mentioned embodiment, a judgment is made in the SUPL server 20 as to whether or not the mobile station 60 has accessed the LTE communication network based on whether information specifying the LTE communication network is contained in a location information request from the mobile station 60. This result is then transmitted from the SUPL server 20 to the location information management device 30, and in the location information management device 30, a judgment is made as to whether or not the communication network accessed by the mobile station 60 is the LTE communication network or the 3G communication network based on information indicating the access point of the mobile station 60 notified from the SUPL server 20, and a request for providing base station information is then made to the communication network that has been judged to have been accessed based on that result.

In providing an explanation of an example of the prior art, in the case a location information request relating to the mobile station 60 able to access two communication networks consisting of the 3G communication network and the LTE communication network has been received in the location information management device 30, since the location information management device 30 was unable to judge which communication network was being accessed by the mobile station 60 to communicate, processing was carried out so as to universally and preferentially inquire to a predetermined communication network (such as the 3G communication network).

This is because the practice of not using service area information was commonly employed in the standards of SUPL location in conventional mobile stations capable of accessing a single communication network (3G communication network).

According to conventional standards relating to SUPL (OMA-AD-SUPL-V1.0 6.4 SUPL Reference Architecture) and standards relating to 3G communication (3GPP TS23.271 9.1.1 Mobile Terminating Location Request), in GPS location by a mobile station in the 3G communication network, in the case of using location information of a base station able to be accessed by a mobile station as assist data, it was not necessary to acquire information specifying which base station is able to be accessed by the mobile station from the mobile station. This is because, in the case of conventional assisted GPS location, in the case of a request to provide location information, it was possible to specify a base station of the communication area able to be accessed by the mobile station by an EBSCP (equivalent to the location information management device 30 of the present embodiment) inquiring to an HSS/HLR (equivalent to the management DB 33 of the present embodiment). Thus, according to these conventional specifications, there was no technical idea of utilizing information from the mobile station 60 (information specifying an access point) for the location information management device 30 from the SUPL server 20 by using information relating to a location information request according to U-Plane transmitted from the mobile station 60 to the SUPL server 20.

Even in the case a mobile station that accesses a single communication network has become the mobile station 60 capable of accessing two communication networks (3G communication network and LTE communication network), since it is unimaginable that information notified by U-Plane from the mobile station 60 would be transmitted from the SUPL server 20 to the location information management device 30, there was no technical idea of utilizing service area information of the mobile station 60 even if that information was acquired by being contained in a location information request.

In contrast, according to the location support system and location method using this location system of the present embodiment, a judgment as to which communication network is being accessed by the mobile station 60 is made on the basis of information specifying the access point of the mobile station 60 notified from the mobile station 60 in U-Plane, and that information is then notified to the location information management device 30 from the SUPL server 20. As a result, in the location information management device 3, requests for location information for use in location the mobile station 60 to a communication network not accessed by the mobile station 60 are suppressed, thereby making it possible to effectively provide location support relating to a mobile station capable of accessing multiple communication networks.

Although the above has provided an explanation of an embodiment of the present invention, the communication system 1 comprising the location system 10 according to the present invention can be modified in various ways.

For example, a configuration may be employed in which all functions relating to each device contained in the location system 10 are contained in a single device, or a configuration may be employed in which each function is respectively dispersed to different devices.

In addition, although an explanation of a configuration in which the mobile station 60 is able to access two types of communication networks (3G communication network and LTE communication network) was provided in the above-mentioned embodiment, the number of accessible communication networks may also be three or more. In this case, judgments similar to those described in the above-mentioned embodiment can be made in the SUPL server 20 and the location information management device 30 by increasing the types of information stored in the management DB 33 and increasing the types of information specifying the communication networks accessed by the mobile station 60.

In addition, in the above-mentioned embodiment, although when terminal information is received in the location information management device 30 as shown in FIG. 8, although the destination to which a base station location request is transmitted is determined by referencing service area information contained in a mobile station after having acquired access point information of both the 3G communication network and LTE communication network from the management DB 33, the order in which these tasks are carried out may be reversed. Namely, a function can be provided in which access point information of only one communication network is acquired from the management DB 33 based on service area information contained in a mobile station.

In addition, although the case of application to a network-assisted GPS method using an SUPL server was explained in the above-mentioned embodiment, the above-mentioned location system and location method can also be used for a cell-based location method, and can also be applied to the providing of contents utilizing location information obtained as a result of this cell-based location. More specifically, as a result of transmitting a location request that requests the providing of location information of a mobile station to a location information management device that controls location information in a communication network from a person who creates contents (LCS client/contents production device) with the consent of the user of the mobile station, location information of the mobile station is acquired in the location information management device, and that information is transmitted to the contents production device in the form of a location result. At this time, as a result of transmitting information specifying the communication network of the access point transmitted from the mobile station to the contents production device when the user of the mobile station consents to the providing of location information from the contents production device to a location information management device, information specifying the communication network accessed by the mobile station is transmitted to the location information management device, thereby enabling location support to be carried out more efficiently by enabling the location information management device to use this information. In this manner, the present embodiment is not limited to SUPL, but rather can also be applied to various technologies requiring the providing of location information of a base station.

REFERENCE SIGNS LIST

1: location system, 10: location system 20: SUPL server, 30: location information management device, 40: exchange #A, 41: base station device #A, 50: exchange #B, 51: base station device #B, 60: mobile station, C1, C2: cell.

The invention claimed is:
1. A location system comprising:
a location information providing device, which provides location information relating to a mobile station that can access a first communication network and a second communication network, which are mutually different from each other, the first communication network and the second communication network utilizing two different types of communication protocols from each other and having an overlapping coverage area; and
a location information management device, which acquires the location information for the location information providing device from the first communication network or the second communication network; wherein,
the location information providing device is provided with:
circuitry configured to
receive a location information request requesting location information relating to the mobile station and containing information that specifies the first communication network in the case where the mobile station accesses the first communication network;
judge whether information specifying the first communication network is contained in the received location information request, transmit, as terminal information, information that includes information specifying the first communication network and information specifying the mobile station to the location information management device in the case where information specifying the first communication network is contained, and transmit, as terminal information, information specifying the mobile station to the location information management device in the case where information specifying the first communication network is not contained; and
transmit location information of the mobile station transmitted from the location information management device to the transmission source of the location information request as a result of transmitting the terminal information to the location information management device, and the location information management device is provided with:
memory that stores information specifying location registration areas formed of multiple communication areas including communication areas that can be accessed by the mobile station in the first communication network and the second communication network, such that the location information management device is configured to simultaneously store location registration information of a cell of the first communication network for the mobile terminal and location registration information of a cell of the overlapping second communication network for the mobile terminal when the mobile station has moved within the coverage area of the second communication network but is only connected to a base station of the first communication network;
circuitry configured to
receive the terminal information transferred from the location information providing device;
judge whether or not information specifying the first communication network is contained in the acquired terminal information, and acquire location information relating to a communication area contained in the location registration area of the first communication network acquired from the first communication network and stored in the memory in the case where information specifying the first communication network is contained, and moreover acquire location information relating to a communication area contained in the location registration area of the second communication network acquired from the second communication network and stored in the memory in the case where information specifying the first communication network is not contained; and
transmit the acquired location information to the location information providing device after associating the same with information specifying the mobile station.

2. A location information providing device contained in a location system formed of a location information providing device, which provides location information relating to a mobile station that can access a first communication network and a second communication network, which are mutually different from each other, the first communication network and the second communication network utilizing two different types of communication protocols from each other and having an overlapping coverage area; and a location information management device, which acquires location information for the location information providing device from the first communication network or the second communication network, the location information management device being configured to simultaneously store location registration information of a cell of the first communication network for the mobile terminal and location registration information of a cell of the overlapping second communication network for the mobile terminal when the mobile station has moved within the coverage area of the second communication network but is only connected to a base station of the first communication network,
the location information providing device being provided with:
circuitry configured to
receive a location information request requesting location information relating to the mobile station and containing information that specifies the first communication network in the case where the mobile station accesses the first communication network;

judge whether information specifying the first communication network is contained in the received location information, and transmit, in the form of terminal information, information that includes information specifying the first communication network and information specifying the mobile station to the location information management device in the case information specifying the first communication network is contained, and moreover transmit, as terminal information, information specifying the mobile station to the location information management device in the case where information specifying the first communication network is not contained; and transmit location information of the mobile station transmitted from the location information management device to the transmission source of the location information request as a result of the transmitting of the terminal information to the location information management device.

3. A location information management device contained in a location system formed of a location information providing device, which provides location information relating to a mobile station that can access a first communication network and a second communication network, which are mutually different from each other, the first communication network and the second communication network utilizing two different types of communication protocols from each other and having an overlapping coverage area; and a location information management device, which acquires location information provided by the location information providing device from the first communication network or the second communication network, the location information management device being provided with:

memory that stores information specifying communication areas in the first communication network and the second communication network that can be accessed by the mobile station after associating the same with information specifying the mobile station, such that the location information management device is configured to simultaneously store location registration information of a cell of the first communication network for the mobile terminal and location registration information of a cell of the overlapping second communication network for the mobile terminal when the mobile station has moved within the coverage area of the second communication network but is only connected to a base station of the first communication network; and circuitry configured to receive terminal information that contains information specifying the mobile station transferred from the location information providing device, judge whether or not information specifying the first communication network is contained in the terminal information acquired by the terminal information reception unit, and acquire location information relating to a communication area contained in a location registration area of the first communication network acquired from the first communication network and stored in the memory in the case where information specifying the first communication network is contained, and moreover acquire location information relating to a communication area contained in the location registration area of the second communication network acquired from the second communication network and stored in the memory in the case where information specifying the first communication network is not contained, and transmit the acquired location information to the location information providing device after associating the same with information specifying the mobile station.

4. A location method that uses a location system formed of a location information providing device, which provides location information relating to a mobile station that can access a first communication network and second communication network, which are mutually different from each other, the first communication network and the second communication network utilizing two different types of communication protocols from each other and having an overlapping coverage area; and a location information management device, which is provided with a memory that stores information specifying communication areas in the first communication network and the second communication network where the mobile station exists after associating the same with information specifying the mobile station, and which acquires location information for the location information providing device from the first communication network or the second communication network, the location information management device being configured to simultaneously store location registration information of a cell of the first communication network for the mobile terminal and location registration information of a cell of the overlapping second communication network for the mobile terminal when the mobile station has moved within the coverage area of the second communication network but is only connected to a base station of the first communication network, the method comprising:

a location information request reception step, carried out by circuitry of the location information providing device, of receiving a location information request requesting location information relating to the mobile station, with information that specifies the first communication network being contained in the case where the mobile station accesses the first communication network;

a terminal information transmission step, carried out by the circuitry of the location information providing device, of judging whether information specifying the first communication network is contained in the location information request received in the location information request reception step, and transmitting, as terminal information, information that includes information specifying the first communication network and information specifying the mobile station to the location information management device in the case where information specifying the first communication network is contained, and moreover transmitting, as the terminal information, information specifying the mobile station to the location information management device in the case where information specifying the first communication network is not contained;

a location information providing step, carried out by the circuitry of the location information providing device, of transmitting location information of the mobile station transmitted from the location information management device to the transmission source of the location information request as a result of transmitting the terminal information to the location information management device in the terminal information transmission step;

a terminal information reception step, carried out by circuitry of the location information management device, of receiving the terminal information transferred from the location information providing device;

a location information acquisition step, carried out by the circuitry of the location information management device, of judging whether or not information specifying the first communication network is contained in the terminal information acquired in the terminal information reception step, and acquiring location information relating to a communication area contained in a location registration area of the first communication network acquired from the first communication network and stored in the memory in the case where information specifying the first communication network is contained, and moreover acquiring location information relating to a communication area contained in the location registration area of the second communication network acquired from the second communication network and stored in the memory in the case where information specifying the first communication network is not contained; and a location information transmission step, carried out by the circuitry of the location information management device, of transmitting location information acquired in the location information acquisition step to the location information providing device after associating the same with information specifying the mobile station.

5. The location system according to claim 1, wherein the first communication network is an LTE network and the second communication network is a 3G network.

* * * * *